United States Patent Office 2,957,769
Patented Oct. 25, 1960

2,957,769

CHOCOLATE PRODUCT AND PROCESS THEREFOR

Irving I. Rusoff, Park Ridge, N.J., assignor to General Foods Corporation, White Plains, N.Y., a corporation of Delaware No Drawing. Filed Apr. 3, 1958, Ser. No. 726,034

18 Claims. (Cl. 99—23)

The present invention relates to cacao products and to a process for producing the same, particularly to a water-soluble flavor concentrate having the full-bodied mild chocolate flavor and aroma characteristic of "dutched" cacao and to a process for obtaining the same. This application relates to the subject matter of my co-pending application, Serial No. 367,350, now issued U.S. Patent No. 2,835,585, and is a continuation-in-part of that application.

Generally, in preparing darker and more soluble chocolate flavored beverages, such as chocolate milk and carbonated or non-carbonated chocolate drinks, the chocolate flavor is imparted to the beverage by using a low-flat cacao material, such as cocoa powder. At best, it provides a turbid product and, therefore, its use is mainly confined to milk. Even then it presents a problem in that some of the cocoa particles settle out and collect on the bottom of the bottle or other container in the form of a sediment. Many proposals have been advanced for dealing with the problem. For example, it has been suggested that gelatinized starches, such as arrowroot, sago, and the like, be added to the beverage to hinder settling of the insoluble particles. Other suggested additives have included gelatin, pectin and various vegetable gums. Of these materials the vegetable gums have attained a more widespread use than have the other materials. Examples of some of the gums which have been used include gum tragacanth, gum arabic, gum karaya, agar-agar and Irish moss, of which Irish moss, with or without the addition of starch, has been most favored. However, none of the above mentioned proposals has resulted in a satisfactory solution to the problem due to the foreign taste, increased viscosity, and in some cases, the sliminess caused in the product by the additives.

On the other hand, attempts have been made to prepare water-soluble products containing the full-bodied chocolate flavor and aroma. Difficulty is had with the separation of the water-soluble materials from the roasted cacao material, particularly from the fat, the hemicellulose and the starch content. Attempts have been made to use high temperatures for the purpose of hydrolyzing the hemicelluloses and gelatinizing the starch so that the same may be ultimately converted to water-soluble sugars. This has mainly served to deteriorate the flavor and remove practically all of the aroma from the product, the problem of separating the water extract from the fat remaining. Thus, such water extracts are possessed of only inferior flavor and aroma and although efforts have been made to concentrate the extracts, they are still weak with regard to flavor. Such heat treatment serves mainly to demonstrate the susceptibility of the chocolate flavor and aroma to deterioration at high temperatures. For this reason the extract is not dried, but is usually handled as a concentrated solution. This introduces the possibility of bacterial spoilage as still another disadvantage.

It is an object of the present invention to provide a flavoring material which possesses the full-bodied mild chocolate flavor and aroma characteristic of dutched cacao and is quickly, completely and highly soluble in water so as to be satisfactory for general flavoring purposes.

A further object is to proved a process whereby the above-described mild chocolate flavoring material may be provided without detriment to the residual, extracted cacao material from which it was derived.

These and other objects will become apparent from the following detailed description.

It has now been discovered that a mild, dutched cacao material containing the full-bodied chocolate flavor and aroma characteristic of dutched cacao which is quickly and highly soluble in water and other aqueous liquids may be provided by dutching with an alkaline substance cacao material selected from the following: (a) fermented, unroasted cacao material containing precursors of chocolate flavor and aroma while extracting said precursors by means of an aqueous extraction liquid, (b) the aqueous extract of said fermented, unroasted cacao material containing said precursors of chocolate flavor and aroma, (c) the roasted aqueous extract of said fermented, unroasted cacao material containing said precursors of chocolate flavor and aroma. In addition, the discovery of the present invention allows the treatment of residual cacao material with a chemical reagent for a length of time sufficient to change its color without in any way influencing the desired mild, dutched chocolate flavor and aroma values obtained in the extract. As a consequence, the thus treated residual cacao material can be colored in many new and different colors and the dutched extract can be recombined therewith to provide a novel flavoring composition.

The characteristic chocolate flavor and aroma is not present in green or unroasted cacao beans and other cacao materials but requires roasting for its development. Apparently the roasting temperatures, which are generally within the range of 230–285° F., bring about certain changes in certain of the cacao constituents with the result that the flavor and aroma are developed. Such constituents are commonly referred to as flavor and aroma precursors.

One of the primary discoveries upon which the process of the present invention is based is that the flavor and aroma precursors can be dutched, are water-soluble and may be extracted from the cacao material. An equally important discovery is that such extractives or precursors may be roasted and dutched in any order, and treated apart from the rest of the cacao material with the development of the full-bodied mild dutched chocolate flavor and aroma.

Further, it has been found that conditions more drastic than those used to extract the flavor and aroma from a roasted chocolate material can be employed in extracting these precursors. The ability of the precursors to withstand high temperatures and remain substantially unchanged is dependent on the amount of water in the extract. When the concentration of precursors in the extract is less than 50%, the extract can be subjected to temperatures within the normal roasting range, that is, from 190° F. to 350° F with substantially no change or flavor development taking place. Therefore, water at temperatures within this range may be used to extract the precursors with complete extraction and without deterioration of the flavor-producing constituents of the cacao material.

Moreover, the extract can be dried to a powder at temperatures below roasting temperatures without in any way harming the flavor and aroma precursors, thus providing the convenience of a powder with regard to storage, handling, stability, and the like.

Also, the extract may be treated with solvents such as chloroform or trichloroethylene to selectively remove the alkaloid, fat or other undesirable content of the extract and there is no deterrent to the flavor and aroma. Theobromine, caffeine and other alkaloids normally present in chocolate materials are considered objectionable in some uses of chocolate and this presents a convenient method for their removal, the flavor being reincorporated into the reside from the original extraction or used as such. Removal of fat insures complete solubility for the flavor extract.

The extract may be treated to obtain the dutched form at any stage, either by adjusting the pH of the extracting solvent with an alkali, or subsequent to the extraction of the cacoa material, by treatment with an alkali, either before or after roasting.

By the term "dutching" is meant the treatment of the extracted chocolate flavor and aroma precursors by means of alkaline substances such as the carbonates, bicarbonates, or hydroxides of sodium, potassium, or ammonium. The dutching process provides an alkaline substance which neutralizes any free acid present in the cacao material and produces water-soluble compounds by reaction with the protein and carbohydrate material present in cacao, thus producing a milder and darker extract of the cacao material.

The pH is modified in proportion to the amount and type of alkaline substance used. The usual pH for dutched cacao is from 6.0 to 8.8, but, depending on the use to be made of the extract and the preference of the consumer, it will vary. Cacao of higher pH, above 7.0, is more suitable for baking and cooking, while a lower pH (6.0–6.8) has been found to be more suitable for soft drinks and beverage cacao.

The unroasted chocolate materials to which the process of the present invention can be applied consist of all types and varieties of fermented or cured cacao beans of any form. For an example of curing, see U.S. Patent No. 2,558,845. The preferred form of the cacao material used in the extraction is broken beans which result from passing whole beans through a cracker to break up the bean and then a fanning device to remove shell particles. However, any form of cocoa, as mentioned above, from whole beans to finely ground beans can be used in the process. Although fat extracted beans may be used, it is unnecessary to extract the cocoa butter prior to extraction of flavor precursors.

The aqueous solvent preferably used in the process of this invention is water. This does not preclude, however, the fact that other solvents containing water in varying amounts can be used. Acetone-water mixtures up to 60% acetone will extract the chocolate precursors as will alcohol-water mixtures. Use of these mixtures produces an extract which is higher in tannins than the pure water extracts and which are also much higher in fat content. Due to the desire to avoid extraction of fat, it is preferred to use water as the extracting solvent. Addition of edible acids or bases to the extracting solvent generally is without benefical effect and may be in most cases undesirable due to excessive salt formation. It has been found, however, that adjustment of the extracting water up to pH 8.5 with any of the materials normally used to dutch cacao such as those listed above, for example, sodium carbonate, potassium carbonate, or sodium hydroxide, results in an extract having the mild dutched flavor on roasting and a much darker color. It is to be understood, therefore, that aqueous solvent in the meaning of the invention is not to be limited to water alone but is to include any water containing solvent which will serve the purpose herein desired.

Extraction of the chocolate precursors from the unroasted cacao can be accomplished over a wide range of temperatures. It has been found that some degree of extraction can be obtained employing extraction temperatures ranging from the temperature of ice water, say 35° F., to temperatures as high as 400° F. and above. It is preferred, however, for practical reasons to use extraction temperatures from about 175° F. to about 325° F., and still more preferred to operate at about 300° F. At temperatures below 175° F., the rate of extraction is too low for efficient commercial operation, although the resulting extract is of high quality. Extraction temperatures substantially in excess of 325° F. may result in a higher yield of soluble solids but the aroma and flavor of these solids are often of an inferior quality.

Another factor to be considered in the process of the present invention is the length of time required for extraction of the cacao material. This is variously influenced by the other factors in the process. A relatively high temperature of extraction would require a shorter time and vice-versa to obtain maximum yields of extract. Within limits, an increase in extracting time results in an increase in the yield of final dry extract. With the weight ratio of water to cacao material of 5:1 and an extraction temperature of 140° F., extraction for 4 hours gives about an 18% increase in yield of extracted solids over a 2-hour extraction under otherwise identical conditions. The extraction is substantially exhaustive for this temperature after 4 hours. No flavor differences in the final product are found between the two extracts. At 300° F., the preferred temperature of extraction, substantially complete extraction is obtained after about 30 minutes. At higher extraction temperatures the use of excessively long periods of time for extraction may give rise to off-flavors and should be avoided.

The weight ratio of the solvent to the cacao material being extracted may be varied according to the time and temperature of extraction and the yield desired. It is preferred to use an amount of water or other aqueous solvent which is about 5 times the weight of the cacao material since this provides for most economical commercial operation under usual conditions of temperature and time of extraction.

Another factor to be considered in connection with the extraction is the degree of subdivision of the cacao beans or other cacao material. Needless to say, to some extent subdivision facilitates the extraction. However, if the cacao material is subdivided to a great degree, difficulty can be expected with regard to the subsequent separation of the aqueous extract. This difficulty could require the use of filter aids which, of course, would be objectionable as far as the subsequent use of the residual extracted cacao material is concerned. It has been found that the optimum degree of subdivision is represented by that of the broken beans and, accordingly, their use is preferred. In such a case it is preferred also to employ percolation extraction techniques, which are described in detail in Example 1 below. While the use of percolation offers advantages, particularly in separating the extract from the residual cacao material and in obtaining an extract of high initial concentration, various other methods for extraction may be employed with good advantage. Such other methods involve the use of a horizontal revolving extracting reel through which the solvent and cacao material may be passed concurrently or countercurrently with respect to each other. Also, extraction kettles may be employed if a batch operation is desired. Although the use of the percolation technique, as mentioned above, serves to partially filter the cacao materials from the aqueous extract, it may be necessary to follow up the percolation with a clarification step. Moreover, the other methods of extraction employed required a filtration step. Such filtration may be effected by any conventional means such as a plate and frame filter, a filter wheel and, of course, a centrifuge may be employed if desired. Also, suction or reduced pressure may be employed as well as pressure, if desired.

Generally, the concentration of solids in the extract of cacao material obtained in accordance with the present invention is 2–6%. This must be concentrated in order to effect the subsequent roasting step. Any temperature and pressure combination that may be desired can be used to a point where the extract is about 50% soluble solids. At this point care should be taken since the development of the flavor and aroma is believed possible at this moisture content, although it occurs only to a slight degree.

By the time the concentration has proceeded to a point where the residue contains 20–30% moisture, the development of flavor and aroma begins to occur to a much greater degree so that care must be taken in connection with the conditions used for concentration, particularly temperature and vacuum. The use of extremely high temperatures, for example, would serve to deteriorate the flavor and drive off the aroma, while the use of reduced pressure would remove aroma. However, the major development of the flavor and aroma occurs when the concentrate is in a substantially dry condition and is being subjected to roasting temperatures, so that the aforementioned precautions relate to the loss of flavor and aroma during concentration and are not of critical importance.

The use of freeze drying or lyophilization is, of course, a very convenient method for avoiding all of the above discussed difficulties with concentration. Generally, a 30% solution may be freeze dried to a point where the extract contains only 1–10% moisture. Roasting is then easily effected without any fear of losing flavor and aroma. On the other hand, the lyophilization technique is generally an expensive one and it is preferred from a standpoint of economy to use controlled methods of heat evaporation.

Roasting is achieved by subjecting the soluble solids of the extract to a temperature from about 190° F. to about 350° F. for periods of time up to about 17 hours. Some additional chocolate flavor is developed in extracted solids roasted for the longer periods at 190° F., but such is not very significant. The time and temperature required to properly develop chocolate flavor and aroma in the soluble solids of the extract depend on the method and apparatus used. One preferred method of roasting involves remoistening of the dried extract by addition of 25% water, spreading the material in a thin film on a stainless steel tray, evaporating the material to about 5% moisture over a steam bath and thereafter subjecting the material to roasting temperatures. When this method is employed, temperatures of from about 250° F., to about 285° F. for periods of time from about 12 minutes to about 3 minutes respectively are preferred.

A further preferred method of roasting involves combined drying and roasting of the liquid extract by spray drying procedures as described in detail in Example 2. With inlet air temperatures of 650°–675° F. and outlet gas temperatures between 280° F. and 300° F., satisfactory flavor and aroma are developed. It is thought, however, that the product temperature seldom rises above 200° F. under these conditions and the time of exposure to these temperatures is of the order of from 20–30 seconds.

The development of flavor and aroma in the extract appears to require that the material be substantially free from moisture at the time of roasting. However, it may be convenient to subject the extract to roasting temperatures when the moisture content has been reduced to as little as from 30–50% since it is believed that none of the development of flavor and aroma begins to occur at such relatively high moisture levels. Moreover, there is some reason to believe that a different and perhaps preferred flavor and aroma is developed when the material subjected to roasting temperatures has an appreciable water content at the beginning of the roasting step.

The pressure under which the extract is roasted seems to have little influence on the amount or rate of flavor development. It is generally convenient to roast the extract open to the atmosphere to allow any moisture present to escape. If desired, however, comparable flavor development may be had by roasting in closed containers under varying pressures depending on the size of the container, the temperature, and the amount of moisture present.

The drying and roasting can be combined into a single step by means of spray drying at such a temperature that drying and roasting is achieved in the same operation. An indication of the conditions needed during spray drying is set forth in Example 2 below. This process offers an opportunity to include other materials along with the solids of the extract to serve as carriers of the flavor. Examples of these carrying materials are sucrose, dextrose, corn sugar, soluble starches, various vegetable gums, and the like. The same effect can be achieved by drum drying or pan drying.

The dry powder thus obtained has a high degree of solubility and is rapidly soluble in water and other aqueous liquids. At the level of from 7.5 to 10 grams per liter of milk, the material is quickly and completely soluble at room temperature. Also, 4 grams of roasted extract may be dissolved in 105 ml. of water with the addition of 56 grams of sucrose to make a concentrated chocolate flavored syrup.

If the dutching is desired to be performed after roasting said chocolate flavoring material, the treatment with alkali is then incorporated to give a product with a flavor and appearance of dutched chocolate. The dutching step may be carried out by treating the extract, either before or after roasting, with a mild alkali, such as 1–3.0% of sodium carbonate, potassium carbonate or sodium hydroxide, such as is customary with regular chocolate material.

Additionally, if it is desired to obtain the dry chocolate flavor concentrate of this invention having the color of dutched or alkali treated chocolate but not the flavor, the process may be divided into two stages. The first stage is the regular extraction of the flavor precursors from the cacao material followed by drying and roasting as described above. The second stage is a dutching of the extracted nibs for a time sufficient to develop the color desired followed by a second extraction of the cacao material to remove the colored material which is then dried and added to the dried flavor extract. The desired color is thereby provided, while at the same time a large part of the dutched flavor is avoided.

It is obvious that other flavor and/or taste ingredients may be added to the extract of chocolate precursors prior to roasting in order to achieve various flavor nuances and that although the preferred embodiment of the cacao extract of this invention is a dry powder, this powder may be partially reconstituted with water and used as a concentrated liquid extract for flavoring purposes.

In order to further illustrate the process and product of this invention, the following detailed examples are set forth.

*Example 1*

Fermented, unroasted Accra cacao beans are cracked and fanned in order to break the beans and to remove the shell. Fifteen pounds of these broken beans are placed in an insulated 3-inch I.D. stainless steel pipe 10 feet in length and mounted vertically with a water inlet at the bottom and with an outlet for removal of the extract at the top of the column. Appropriate retaining screens at each end of the pipe reduce the effective length of the column to approximately 9 feet 6 inches. The cacao is then extracted by admitting the water at 200° F. into the bottom of the column at the rate of 0.085 gallon per minute and causing the water to move upwardly through the beans, the extract being drawn off at the top. The rate of flow of the water through the column is regulated to maintain the desired temperature within the column. Extraction for one hour in this manner removes substantially all of the available soluble solids and results in about 75 pounds of aqueous extract or solution containing about 1.5 pounds of extracted cacao material.

Concentration of the extract is carried out in a steam jacketed kettle at 212° F. until the solution contains approximately 30% soluble solids. The remaining water is then removed from the concentrate by freeze drying in order that the solids may be stored without change.

For the roasting step and dry extract is remoistened by addition of 25% water and spread in an even layer approximately ¼ inch thick on a stainless steel tray. This tray is then placed in an oven at 285° F. and the material allowed to roast for 3 minutes. Following roasting the material is allowed to cool and is removed from the tray by scraping. The yield is approximately 1.45 pounds of a dried, roasted extract which contains less than 0.3% fat.

Ten grams of the dried, roasted extract may then be mixed with 5 ml. of 2.5% sodium hydroxide and allowed to stand at room temperature, 68° F., for 120 minutes. The roasted extract is then dried for 240 minutes at 125° F. The product has a dark color and desirable chocolate flavor and aroma characteristic of dutched cacao.

Two grams of the dried material are dissolved along with 18 grams of sugar and 200 grams of cold milk. The resulting beverage has an excellent mild chocolate flavor and aroma, characteristic of dutched cacao.

*Example 2*

Fermented, unroasted Accra cacao beans are broken as described in Example 1. Ninety-six pounds of these broken beans are extracted in the same manner as Example 1 using water at a temperature of about 300° F. Six runs using a single column are required. The water extract consists of about 7.6% of the original cacao bean solids and is concentrated in a pot still at 125° F. and a vacuum of 25 inches until the solution contains about 30% solids. The liquid concentrate is then spray dried in a Western Precipitation Company Type N spray dryer. This dryer is approximately 8 feet high and 3 feet in diameter and is of the double cone type. The drying conditions are adjusted so as to achieve drying and roasting of the extract in the same operation. Air temperature at the inlet varies between 650° and 675° F. while the outlet temperature is from 280°-300° F. An air flow rate through the dryer of 160 cubic ft./minute at standard conditions is used. The pump pressure (liquid) is 3 lbs./square inch (gauge) and air pressure at the fluid nozzle is 20–25 lbs./square inch (gauge) using a Spray System pneumatic atomizing nozzle (¼ J–SS). The density of the dry roasted powder obtained is 0.15 gm./cc.

Ten grams of the spray dried extract may then be mixed with 5 ml. of 2.5% potassium carbonate and allowed to stand at room temperature, 68° F., for 120 minutes. The roasted extract is then dried for 240 minutes at 125° F. The product has a dark color and desirable chocolate flavor and aroma characteristic of dutched cacao.

A portion of the powder prepared above is incorporated as a flavoring ingredient in a carbonated beverage and evaluated as to taste and appearance. The beverage is clear and has a mild chocolate flavor and aroma characteristic of dutched cacao. No sediment develops in the bottom of the bottle.

Advantageously, the residue after extraction of the flavor precursors can then be treated with whatever chemical reagent is appropriate to produce a distinctly different colored chocolate liquor. Since the flavor and aroma precursors have been separated from this residue and are roasted separate from the residue, there is no change in the flavor constituents of the chocolate flavoring composition produced.

The chemical reagent which is used can be any reagent which will change the color of the residue of cacao material or the liquor made therefrom. Thus it is possible to produce either a very light colored chocolate or a very dark colored chocolate or even a red colored chocolate.

To produce a light colored chocolate liquor suitable for blending with darker chocolate liquor or for use alone, a peroxide such as hydrogen peroxide may be used as a bleaching agent to bleach the cacao residue.

To produce a dark colored chocolate, a treatment of the cacao residue with mild alkali, such as potassium or sodium carbonate or sodium hydroxide, results in a liquor of very dark color. This dark colored material may then be blended with other liquors to produce any desired result or any color shading of chocolate that is desired.

It is further possible by means of this invention to produce a red colored chocolate by exposing the residual cacao material to a strong acid, such as hydrochloric acid. Any strong acid will produce the same result. Examples of acids that will change the color of the cacao residue to red are the above-stated hydrochloric, and nitric, phosphoric, and sulfuric acids.

For a more detailed description of the manner in which the foregoing treatment of the cacao residue is carried out reference is hereby made to my co-pending application, Serial No. 367,350, filed July 10, 1953, now issued U.S. Patent No. 2,835,585, and my application filed of even date, also entitled "Chocolate Product and Process Therefor."

After production of the residual cacao material, it is then possible to add to this cacao material a chocolate flavoring composition produced in accordance with the processes of the present invention. Thus, through the recombination of the desired flavor and aroma precursors present in a water-soluble composition of the present invention with the novel colored residue, it is possible to obtain confectionery products having a variety of desired colors as well as a mild, dutched flavor.

It will be understood that while the invention has been described with particular reference to the above examples, the invention is not necessarily limited thereto. Reference should therefore be had to the appended claims for a definition of the limits of the invention.

What is claimed is:

1. A process for preparing a mild, dutched chocolate flavoring material which comprises contacting an aqueous extract of fermented, unroasted cacao material containing precursors of chocolate flavor and aroma with an aqueous alkaline extraction liquid whereby said precursors are extracted from said unroasted cacao material and pass into said liquid to form a dutched aqueous extract, separating from the cacao material the said extract containing soluble precursors of chocolate flavor and aroma, evaporating the aqueous extract to form a semi-solid mass, and roasting this mass to develop the mild, dutched chocolate flavor and aroma.

2. The process of claim 1 wherein the temperature of the extraction liquid is 175°–325° F.

3. A process for preparing a mild, dutched chocolate flavoring material which comprises contacting fermented, unroasted cacao material containing precursors of chocolate flavor and aroma with an aqueous extraction liquid whereby said precursors are extracted from said unroasted cacao material and pass into said liquid to form an aqueous extract, separating from the cacao material the said extract containing soluble precursors of chocolate flavor and aroma, evaporating the aqueous extract to form a semi-solid mass, roasting this mass to develop the chocolate flavor and aroma, and treating said mass with an alkaline substance to develop the mild, dutched chocolate flavor and aroma.

4. The process of claim 3 where the temperature of the extraction liquid is 175°–325° F.

5. A process for preparing a mild, dutched chocolate flavoring material which comprises contacting fermented, unroasted cacao material containing precursors of chocolate flavor and aroma with an aqueous extraction liquid whereby said precursors are extracted from said unroasted cacao material and pass into said liquid to form an aqueous extract, separating from the cacao material said extract containing soluble precursors of chocolate flavor and aroma, evaporating the aqueous extract to form a semi-solid mass, treating said semi-solid mass with an alkaline substance to dutch said mass, and roasting said mass to develop the mild, dutched chocolate flavor and aroma.

6. The process of claim 5 where the temperature of the extraction liquid is 175°–325° F.

7. A process for preparing a mild, dutched chocolate flavoring material which comprises contacting fermented, unroasted cacao material containing precursors of chocolate flavor and aroma with an aqueous alkaline extraction liquid, whereby said precursors are extracted from said unroasted cacao material and pass into said liquid to form an aqueous extract, separating from the cacao material the said extract containing soluble precursors of chocolate flavor and aroma, concentrating said extract to a moisture content of less than 50%, evaporating said concentrated extract to dryness and roasting said dried extract at 190°–350° F. to develop the mild, dutched chocolate flavor and aroma.

8. A process for preparing a mild, dutched chocolate flavoring material which comprises contacting fermented, unroasted cacao material containing precursors of chocolate flavor and aroma with an aqueous extraction liquid, whereby said precursors are extracted from said unroasted cacao material and pass into said liquid to form an aqueous extract, separating from the cacao material the said extract containing soluble precursors of chocolate flavor and aroma, concentrating said extract to a moisture content of less than 50%, treating said extract with an alkaline substance, evaporating said concentrate extract to dryness and roasting said dried extract at 190°–350° F. to develop the mild, dutched chocolate flavor and aroma.

9. A process for preparing a mild, dutched chocolate flavoring material which comprises contacting fermented, unroasted cacao material containing precursors of chocolate flavor and aroma with an aqueous extraction liquid, whereby said precursors are extracted from said unroasted cacao material and pass into said liquid to form an aqueous extract, separating from the cacao material the said extract containing soluble precursors of chocolate flavor and aroma, concentrating said extract to a moisture content of less than 50%, evaporating said concentrated extract to dryness, and roasting said dried extract at 190°–350° F., and treating said extract with an alkaline substance to develop the mild, dutched chocolate flavor and aroma.

10. A process for preparing a mild, dutched cacao material which comprises dutching with an alkaline substance cacao material selected from the group consisting of: (1) an aqueous extract of fermented unroasted cacao material containing precursors of chocolate flavor and aroma, (2) a concentrated semi-solid aqueous extract of unroasted cacao material containing precursors of chocolate flavor and aroma, and (3) a roasted concentrated aqueous extract of cacao material containing concentrated flavor precursors of chocolate flavor and aroma.

11. The process of claim 10 where the alkaline substance is sodium hydroxide.

12. The process of claim 10 where the alkaline substance is sodium carbonate.

13. The process of claim 10 where the alkaline substance is ammonium hydroxide.

14. The product of the process of claim 10.

15. The process of claim 10 where the residue of fermented, unroasted cacao material after the flavor and aroma precursors have been extracted therefrom is treated with a chemical reagent for a length of time sufficient to change its color, and whereafter the said mild, dutched cacao flavoring material is added to said treated residue.

16. The process of claim 15 where the chemical reagent is a peroxide bleaching agent.

17. The process of claim 16 where the chemical reagent is a strong acid.

18. The process of claim 15 where the chemical reagent is a mild alkali.

References Cited in the file of this patent
UNITED STATES PATENTS

| | | |
|---|---|---|
| 1,563,682 | Barnitt | Dec. 1, 1925 |
| 2,380,158 | Durrenmatt et al. | July 10, 1945 |
| 2,813,795 | Hale | Nov. 19, 1957 |
| 2,835,585 | Rusoff | May 20, 1958 |